(No Model.) 2 Sheets—Sheet 1.

F. HANSON.
STEAM PIPE COUPLING.

No. 410,547. Patented Sept. 3, 1889.

ATTEST.
J Henry Kaiser
Victor J. Evans

INVENTOR.
Freeman Hanson
By L. Deane
his Atty.

N. PETERS, Photo-Lithographer, Washington, D. C.

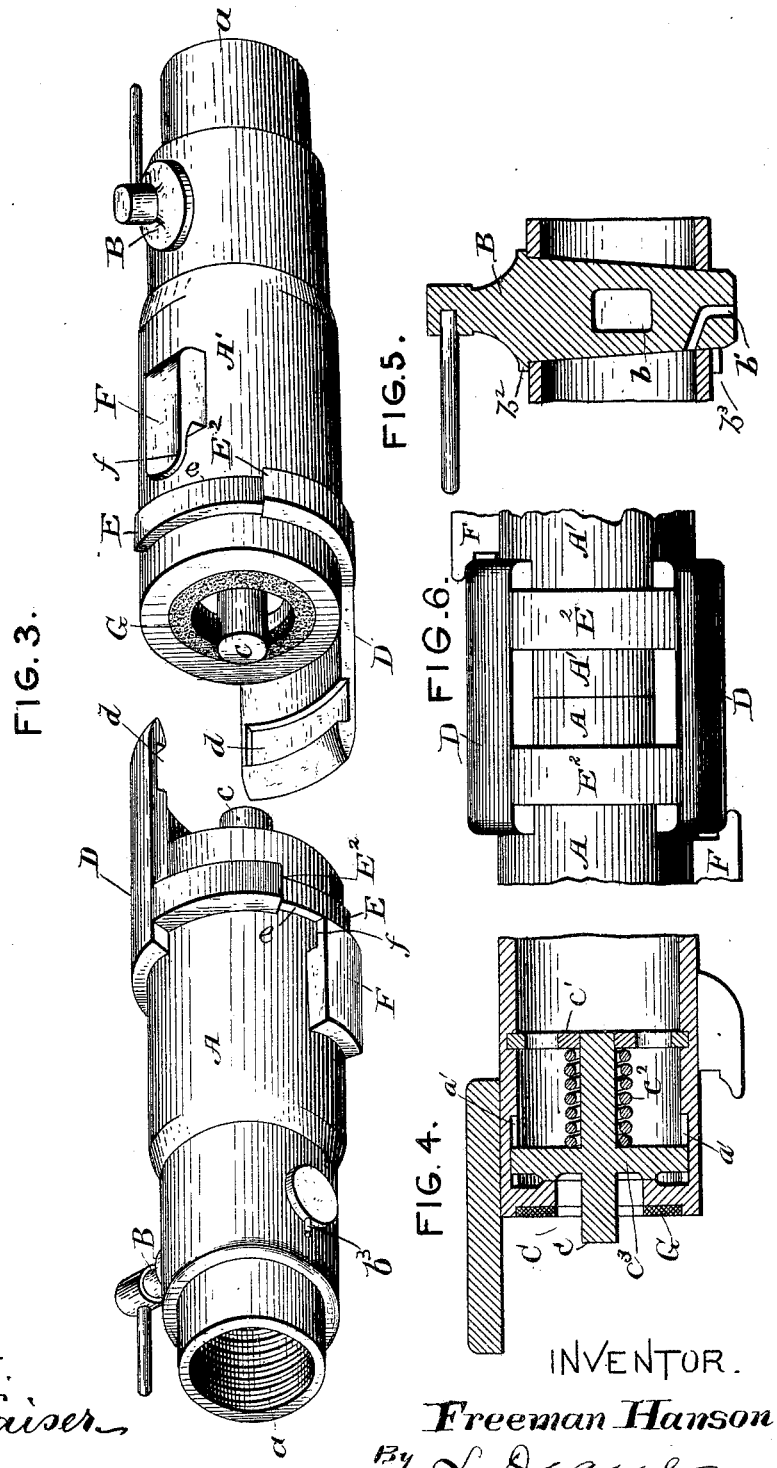

UNITED STATES PATENT OFFICE.

FREEMAN HANSON, OF BAR MILLS, ASSIGNOR OF THREE-FOURTHS TO CHARLES B. HARMON, OF BIDDEFORD, AND GEORGE E. BIRD AND HERBERT G. BRIGGS, BOTH OF PORTLAND, MAINE.

STEAM-PIPE COUPLING.

SPECIFICATION forming part of Letters Patent No. 410,547, dated September 3, 1889.

Application filed January 16, 1888. Serial No. 260,894. (No model.)

*To all whom it may concern:*

Be it known that I, FREEMAN HANSON, a citizen of the United States, residing at Bar Mills, in the county of York and State of Maine, have invented certain new and useful Improvements in Steam-Pipe Couplings; and I do hereby declare the following to be a full, clear, and exact description of the invention, such as will enable others skilled in the art to which it appertains to make and use the same.

Figure 1:
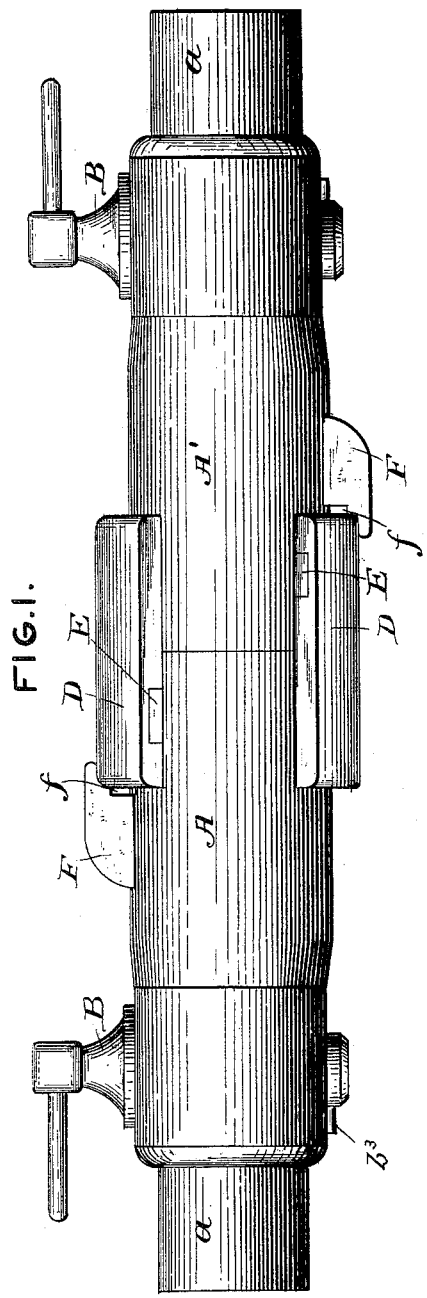
Figure 2:
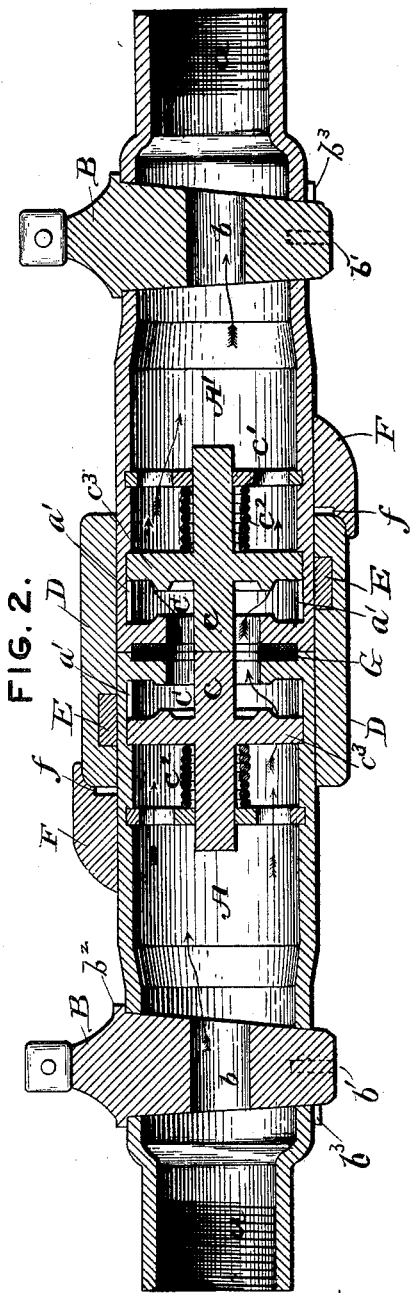

Figure 1 is a side elevation. Fig. 2 is a central longitudinal section of Fig. 1. Fig. 3 is a perspective view showing the parts detached. Fig. 4 is a detail in longitudinal section of the end of one part of the coupling. Fig. 5 is a detail in section of a cut-off valve. Fig. 6 is an elevation in detail of the joint from the side opposite to that in Fig. 1.

The invention relates to improvements in pipe-couplings, being particularly adapted for steam-pipe joints.

It consists in the construction and novel combination of parts, hereinafter described, illustrated in the accompanying drawings, and pointed out in the appended claims.

Referring to the drawings by letter, A A' designate the opposite sections of the coupling and adapted to be locked together by the means and in the manner hereinafter described. As each of the said sections has a similar construction, a description of one section only is necessary.

$a$ is the outer end of the section, internally threaded to screw onto a section of pipe, (not shown,) and B is a stop-cock having preferably a conical or tapered plug provided with the transverse opening $b$, the drip-opening $b'$, Fig. 5, to discharge the water of condensation, and the circumferential shoulder $b^2$ at its larger end, to cause it to make a close joint with the section.

C is a valve having the central stem $c$, which projects from each side thereof and moves in a central opening in the perforated guide-diaphragm $c'$, that is secured at a proper point within the section, and $c^2$ is a coiled spring between the said diaphragm and the valve, which tends to force the latter outward. The valve-disk $c^3$ is perforated, as shown by the arrows in Fig. 2, and projects at opposite points into the longitudinal guide-recesses $a'$ within the section, and is thereby prevented from turning upon its seat and consequently wearing by friction.

The sections A A' are internally flanged at their meeting ends, and when uncoupled the stem $c$ of each projects through the opening which the said flange surrounds, and the disk closes said opening (being driven outward by the spring) and prevents the escape of steam. When the sections are coupled, however, the stems $c$ mutually force each other inward against the action of the corresponding spring, and thereby permit free passage of steam from one section to the other.

Each section is provided on its exterior with a cam-rib E, extending on it circumferentially about one-quarter of its periphery and having the properly-inclined inner cam-edge $e$, Fig. 3.

Diametrically opposite the cam-rib the section is provided with the curved longitudinal projection D, as wide as the cam-rib is long, and provided on its inner concave surface with a cam-groove $d$, inclined correspondingly to and adapted to receive the cam-rib of the opposite section.

$E^2$ designates a stop-rib extending circumferentially from the wider end of the cam-rib to the projection D, and likewise has a length of about one-quarter of the periphery of the section.

It will be observed that one-quarter of the said periphery between the projection D and the smaller end of the cam-rib, or the end at which the cam-edge $e$ is nearest the end of the coupling-section, is plain or without projections or ribs of any kind, so that the projection D of the opposite section will lie closely thereon.

When in the process of coupling the sections A and A' are placed end to end toward each other and the projections D directed to the plain surfaces and are then brought together, the back smooth edges of D fit close together and constitute the guides on which the two parts are moved, and when said parts are in this way brought close together with the front edges of said projections opposite the stop-ribs each cam-rib registers with the cam-groove of the opposite section and has its smaller end standing at the beginning of said groove. If either section is then given one-quarter turn, the cam-ribs will enter the grooves, and on account of the inclination of both will bind the ends of the sections closely together.

The outer edge of each projection D is beveled or rounded on its outer surface, and when the section is turned, as described, the said edge passes under the correspondingly-beveled lip $f$ of the keeper-block F, attached to the opposite section, inward from the cam-rib thereon, as shown in Figs. 1 and 6. These keeper-blocks prevent the sections from separating laterally.

If desired, the meeting end of each section may be recessed and provided with a packing-washer, as shown at G, Figs. 2 and 4. This is the preferable construction, as it makes the joint tighter.

When the cam-ribs are fully engaged in the cam-grooves, the projections D impinge against the stop-ribs and prevent the sections from being turned farther on each other.

It will be observed that this coupling is not made in "rights and lefts" or "male and female." Such construction requires that at the end of one pipe the coupling part should be a "right" or "left" or "male" or "female," while that at the end of the other pipe should be the opposite. In my coupling, as shown in the drawings, and fully described above, both parts of the coupling are alike.

Having described my invention, I claim—

1. A pipe-coupling composed of two similar sections adapted to be locked together by turning, and each provided with a cam-rib extending circumferentially about one-quarter of the periphery of the section and provided with an inner cam-edge $e$, a longitudinal projection D, as wide as the cam-rib is long on the side opposite said rib, and provided with the cam-groove $d$ in its inner surface, and a fixed keeper-block F inward from the cam-rib, substantially as specified.

2. A pipe-coupling composed of the two sections A A', each provided with the cam-rib E, having the cam-edge $e$, the stop-rib $E^2$, the longitudinal projection D, having the cam-groove $d$, and the keeper-block F, having the lip $f$, substantially as specified.

3. In a pipe-coupling, as described, the combination of the sections A A', each provided with a cam-rib having a cam-edge and stop-rib and a projection internally cam-grooved, and block F, having lip $f$, with the perforated valves C, having the stems $c$, projecting from each side, the perforated diaphragms secured at proper points within the sections, and the coiled springs $c^2$ between said diaphragms and the disk $c^3$ of the valves, substantially as specified.

4. In a pipe-coupling, as described, composed of two parts, each part similarly constructed and having one-quarter of its periphery plain, a cam-rib, and a projection D, as wide as the cam-rib is long, and having a cam-groove in its under surface, substantially as set forth, whereby, when the two sections are placed end toward end, said projections D stand toward the plain surfaces, and are adapted to fit back to back and act as guides by which the two parts are brought together.

In testimony whereof I affix my signature in presence of two witnesses.

FREEMAN HANSON.

Witnesses:
HARRISON M. DAVIS,
REUBEN TOWNSEND.